United States Patent [19]

Balch

[11] 4,298,182

[45] Nov. 3, 1981

[54] LOCKING FLUID VALVE

[76] Inventor: Duane C. Balch, 3827 Briarwood St., Napa, Calif. 94558

[21] Appl. No.: 169,889

[22] Filed: Jul. 17, 1980

[51] Int. Cl.³ .................. F16K 1/00; F16K 35/02; F16K 31/60

[52] U.S. Cl. .................. 251/251; 137/351; 184/1.5; 222/153; 251/144; 251/297; 251/322; 251/330; 251/DIG. 1; 277/167.5

[58] Field of Search .............. 222/153, 505; 251/103, 251/105, 93, 107, 108, 113, 114, 115, 144, 251, 297, DIG. 1, 319, 322, 320, 321, 324, 330, 214; 184/1.5; 137/351; 277/167.5, 217

[56] References Cited

U.S. PATENT DOCUMENTS

| | | | |
|---|---|---|---|
| 127,883 | 6/1872 | Hotz | 251/107 |
| 1,764,991 | 6/1930 | Siebs | 251/232 |
| 1,837,552 | 12/1931 | Kelly | 251/114 |
| 2,187,247 | 1/1940 | Nichols | 184/1.5 |
| 2,425,779 | 8/1947 | Allen | 251/321 |
| 2,657,705 | 11/1953 | Gerhard et al. | 184/1.5 |

FOREIGN PATENT DOCUMENTS

| | | | |
|---|---|---|---|
| 514072 | 9/1952 | Belgium | 137/316 |
| 634608 | 2/1962 | Italy | 251/214 |
| 826873 | 1/1960 | United Kingdom | 251/324 |

Primary Examiner—Martin P. Schwadron
Assistant Examiner—G. L. Walton
Attorney, Agent, or Firm—James R. Cypher

[57] ABSTRACT

A locking fluid valve assembly including a housing adapted for connection to a fluid reservoir such as an automobile crankcase, a valve piston member for sealing and unsealing a drain passage through the housing and a piston closure member which is held under tension against the outside wall of the housing when the valve is closed.

6 Claims, 8 Drawing Figures

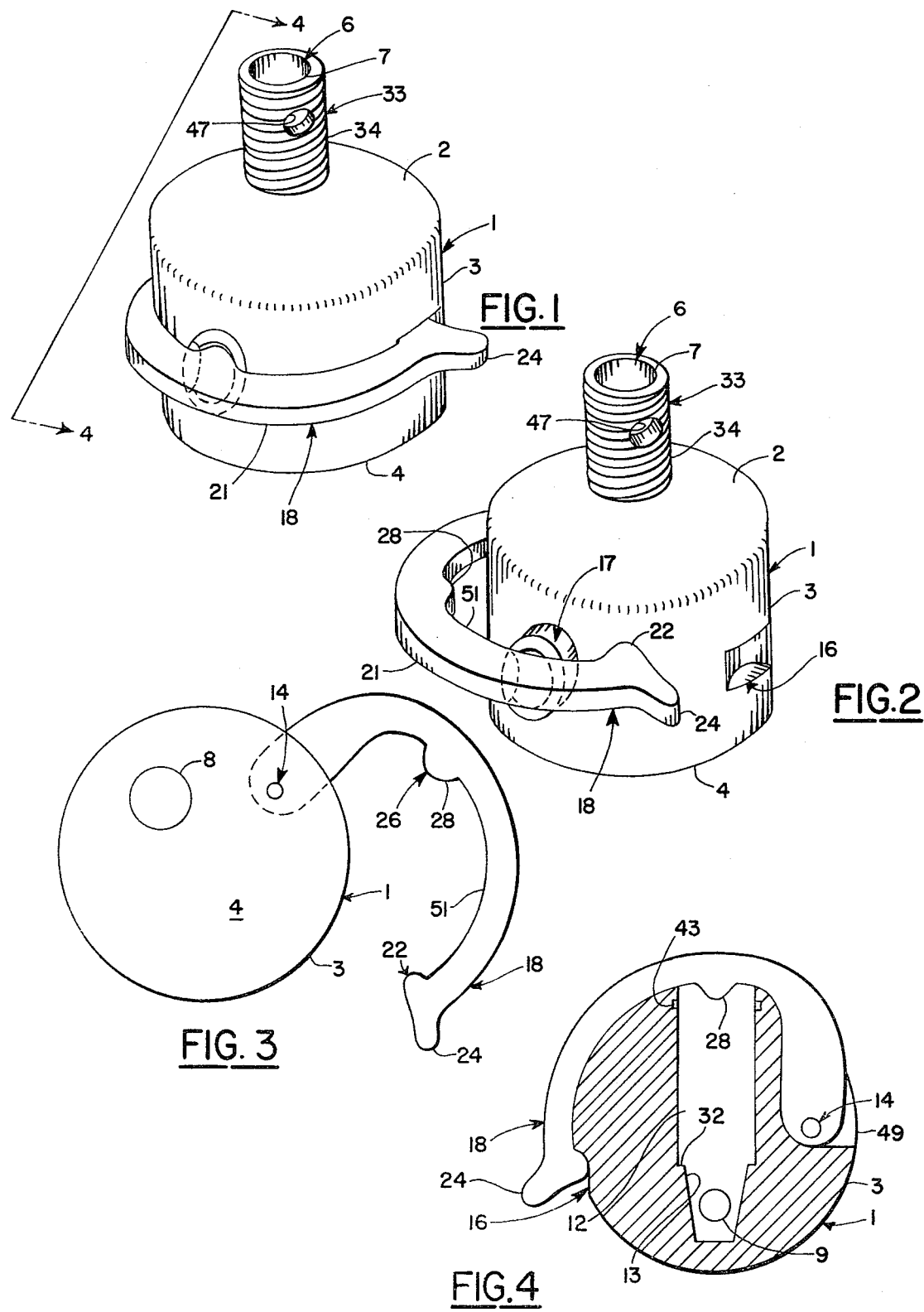

LOCKING FLUID VALVE

BACKGROUND OF THE INVENTION

This invention is an alternative form of my LOCKING CRANKCASE DRAIN VALVE ASSEMBLY disclosed in pending U.S. application Ser. No. 031,466, filed Apr. 19, 1979, now U.S. Pat. No. 4,231,544.

The present drain valve assembly may be used as original equipment or replacement equipment for the common pet cock for draining radiators of water cooled engines, as original or replacement equipment for the standard oil drain plug commonly used for draining oil from crank cases of internal combustion engines; as original or replacement valves for liquid petroleum drums, chemical drums or drums containing powders; as original or replacement drain valve assemblies for draining fluids from automobile differentials and automatic transmissions; and as a drain valve assembly for the instant bleeding of various systems.

SUMMARY OF THE INVENTION

The locking fluid valve of the present invention consists of only three main parts; a valve housing, a reciprocating piston and a locking lever.

The locking valve is designed to provide a quick opening, inexpensive, and reliable valve assembly.

The assembly is designed so that none of the parts are separable from one another thus eliminating accidental loss of parts when draining fluids.

The valve is positive locking and will not accidentally open under vibration or temperature change. The valve may be opened by hand without the use of tools.

BRIEF DESCRIPTION OF THE DRAWINGS

FIG. 1 is a perspective view of the locking fluid valve of the present invention in the closed position.

FIG. 2 is a perspective view of the valve shown in FIG. 1 in the open position.

FIG. 3 is a bottom plan view of the valve illustrated in FIGS. 1 and 2.

FIG. 4 is a cross sectional view of the valve shown in FIG. 1 taken generally alone line 4—4 and looking upwardly and with the valve piston removed.

DESCRIPTION OF THE PREFERRED EMBODIMENT

Figure 5:
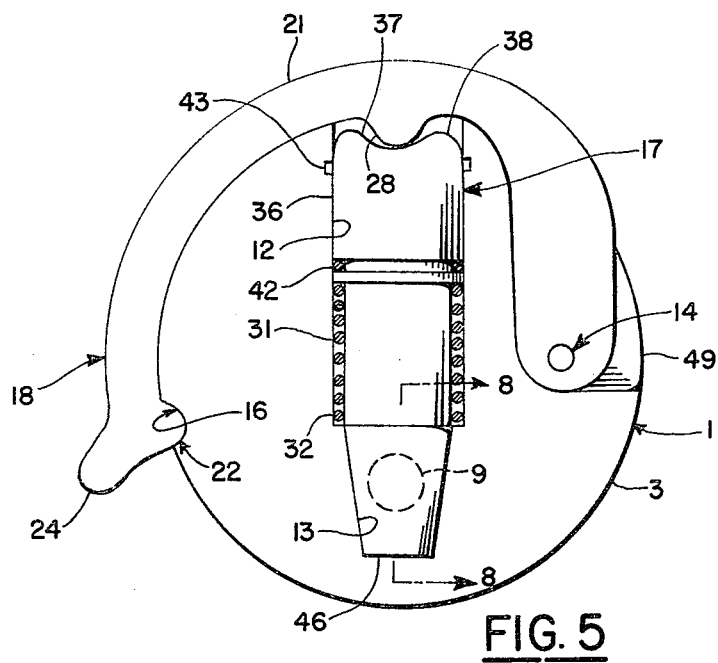
FIG. 5 is a slightly enlarged cross sectional view of the valve shown in FIG. 1, also taken along line 4—4 and looking upwardly and with the valve piston in place.
Figure 6:
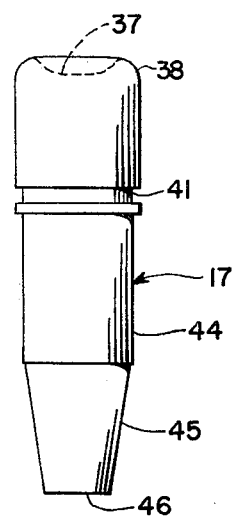
FIG. 6 is a side view of the valve piston removed from the housing.
Figure 7:
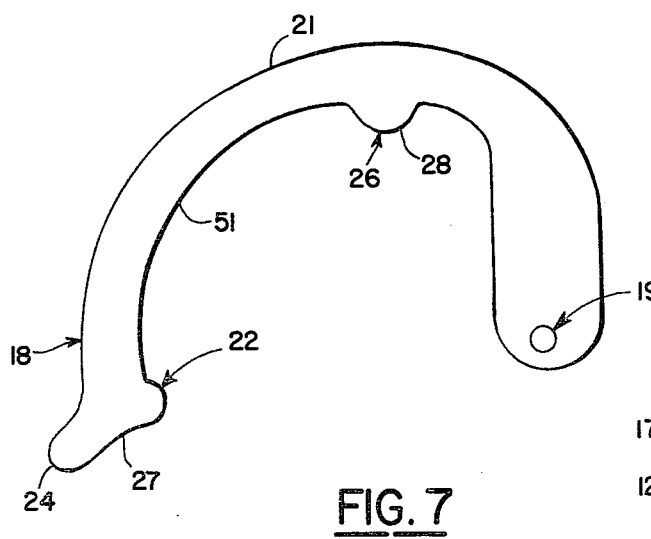
FIG. 7 is a plan view of a portion of the handle of the valve.

The locking drain valve assembly consists briefly of a valve housing 1 having an upper wall 2, side walls 3 and bottom wall 4. Since the housing is usually permanently connected to the container it is designed to drain, it may have a smooth round side wall without any faceted sides for receipt of a wrench or other removal tool. Preferably the housing is made from a high thermal plastic which is injection molded and to prevent accidental stripping of the threads it is preferable that the housing is constructed so that no high leverage tool can be conveniently used to engage the outside of the housing.

A drain passage 6 is formed through the housing and has an inlet opening 7 in the top wall and an outlet opening 8 in the bottom wall. The inlet portion 9 is smaller than the discharge portion 10 of the drain passage.

A transverse passage 12 is formed through the side wall and intersects the drain passage 6. A valve seat 13 is formed in the transverse passage 12 at the intersection of the drain passage 6. A hinge attachment means 14 such as a pin is formed in the housing and is positioned offset from the transverse passage.

A catch 16 which may be an indent is formed in the housing at a selected distance from the hinge attachment means 14. A valve piston member 17 is formed for reciprocation within the transverse passage and is dimensioned for sealing engagement with the valve seat in a closed position and away from the valve seat in an open position.

A piston closure member 18 includes a pivot means 19 such as a pin for pivotal attachment to the hinge attachment means 14, and a spring lever portion 21 which extends outwardly from the housing and has engaged and unengaged positions. A latch means 22 is formed in the distal end 27 of the piston closure member at a selected distance from the pivot means 19. In the unstressed state of the piston closure member the arcuate distance from the latch means 22 to the pivot means 19 is less than the arcuate distance from the catch 16 to the hinge attachment means 14. Thus when the piston closure member is in the engaged position it is in tension.

A grip means 24 extends from the piston closure member 18 for receiving a finger or tool for moving the piston closure member. A piston engagement means 26 such as a protrusion 28 is connected to the piston closure member for engaging and urging the valve piston member toward the closed position.

Spring means 31 is connected to the housing as by a shoulder 32 formed in the transverse passage and urges the valve piston member to the open position.

Connection means 33 such as a threaded shank 34 formed with drain passage 6 is adapted for connection to a fluid source.

As shown in FIGS. 2, 4, 5 and 6, the valve piston member 17 has an end 36 formed with a dish shaped indentation 37 which is engaged by protrusion 28 on a piston closure member 18.

To permit easier engagement of the end of the piston closure member 18, it may be formed with a rounded shoulder 38.

To prevent accidental removal of the valve piston member 17 from the transverse passage 12, the valve piston member is formed with a first annular groove 41. An O-ring 42 is dimensioned for receipt within the annular groove 41 in the valve piston member 17. A second annular groove 43 is formed in the transverse passage 12 for receiving a portion of the O-ring 42.

The valve piston member 17 could have various shapes. As shown in the drawings, the valve piston member is formed with a cylindrical portion 44 and a conical portion 45. The conical portion has a blunt end face 46. The valve seat 13 is formed with a conical portion for registered receipt with the conical portion of the valve piston member.

To ensure complete drainage of the fluid reservoir to which the threaded shank 34 is attached, an opening 47 may be formed in the sidewall which connects with drain passage 6.

Operation of the locking drain valve assembly is similar whether the valve is used for draining automobile crankcases, radiators or barrels. The threaded shank 34 is threaded to the matching threads of the fluid container.

Figure 8:
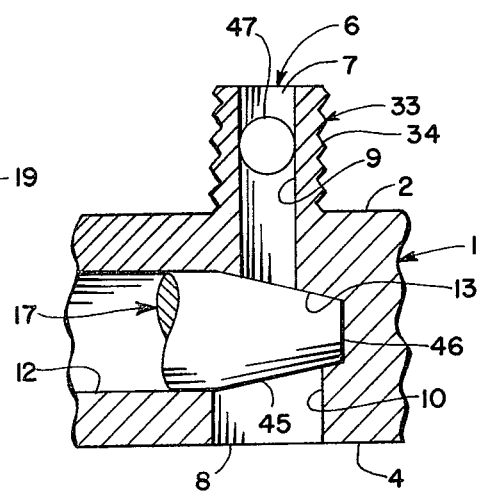
FIG. 8 is an enlarged view of a portion of the valve in cross section taken along line 8—8 of FIG. 5.

To open the valve, it merely takes a finger to engage the grip means 24 which may be an outwardly curved portion of valve piston member 17. Latch means 22 is released from catch 16 formed in the sidewall of the housing by a slight pull on grip means 24. Since the spring lever portion 21 is in tension, the piston closure member 18 will literally pop away from the side wall of the housing. Movement of the piston closure member 18 is aided by spring 31 which forces valve piston member 17 outwardly against rounded protrusion 28 on the piston closure member. The entire piston closure member pivots about pin 19. As the piston closure member is moved further outwardly, the valve piston member also moves outwardly until O-ring 42 reaches second annular groove 43 in the transverse passage 12. At this point, the compressed O-ring expands into the second annular groove 43. Fluid passes through inlet portion 9 in the threaded shank and in the valve housing, past valve seat 13 and into enlarged discharge portion 10. Since enlarged discharge portion 10 is coaxial with but greater in diameter than the inlet portion 9 of the drain passage 6 as shown in FIG. 8, fluids such as thick oil do not flow down the sides of the enlarged passage and adhere to the bottom wall 4 by surface tension. Thus there is generally no need for rags to clean up the usual mess when changing oil in an automobile.

A slotted opening 49 may be formed in the sidewall of the housing to receive a portion of the piston closure member 18 to reduce the overall dimensions of the locking fluid valve and to partially protect the piston closure member from accidental damage.

To close the valve, the piston closure member 18 is engaged by the grip means 24 and moved about its pivot means 19. The inside curved face 51 of the piston closure member engages and urges the valve piston member 17 back into the transverse passage 12 against the force of spring 31. As the piston closure member continues to close, protrusion 28 moves over rounded shoulder 38 on the end of the valve piston member. The protrusion 28 then slides down the dish shaped indentation 37 until it reaches the bottom point of the dish shaped indentation. Since latch means 22 is not yet in engagement with the catch 16 in the housing, and because the dimensions of the upsprung piston closure member do not permit locking engagement, it is necessary to push against the midpoint of the spring lever portion with a finger to force the latch means 22 into engagement with catch 16. Thus in the closed positon of the valve, the piston closure member 18 is in tension to maintain a tight seal of the valve piston member in its valve seat 13.

I claim:

1. A locking drain valve assembly comprising:
   a. a valve housing 1 having an upper wall 2, side walls 3 and bottom wall 4 including;
      (1) a drain passage 6 formed through said housing having an inlet opening 7 in said top wall and an outlet opening 8 in said bottom wall,
      (2) a transverse passage 12 formed through said side wall intersecting said drain passage,
      (3) a valve seat 13 formed in said transverse passage at the intersection of said drain passage,
      (4) hinge attachment means 14 formed in said housing and positioned offset from said transverse passage;
      (5) catch means 16 formed in said housing at a selected distance from said hinge attachment means;
   b. a valve piston member 17 formed for reciprocation within said transverse passage and dimensioned for sealing engagement with said valve seat in a closed position and away from said valve seat in an open position,
   c. a piston closure member 18 including:
      (1) pivot means 19 for pivotal attachment to said hinge attachment means 14,
      (2) a spring lever portion 21 extending outwardly from said housing having engaged and unengaged positions,
      (3) latch means 22 formed in the distal end 27 of said piston closure member at a selected arcuate distance from said hinge attachment means 14 which in its unstressed state is less than the arcuate distance of said catch 16 from said hinge attachment means 14 so that when said piston closure member is in said engaged position said spring lever portion is in tension,
      (4) grip means 24 extending from said distal end 27 for receiving a finger or tool for moving said piston closure member,
      (5) piston engagement means 26 connected to said piston closure member for engaging said valve piston member and urging said valve piston member toward said closed position;
   d. spring means 31 connected to said housing and urging said valve piston member to said open position, and
   e. connection means 33 operatively connecting said drain passage in said housing and adapted for connection to a fluid source.

2. A locking drain valve assembly as described in claim 1 comprising:
   a. said valve piston member has an end 36 formed with a dish shaped indentation 37, and
   b. said piston engagement means on said piston closure member includes a rounded protrusion 28 for engaging said dish shaped indentation.

3. A locking drain valve assembly as described in claim 2 comprising:
   a. said end of said valve piston member having said dish shaped indentation is formed with a rounded shoulder 38; and
   b. said rounded protrusion on said piston engagement means is dimensioned to slidably engage said rounded shoulder.

4. A locking drain valve assembly as described in claim 1 comprising:
   a. said valve piston member is formed with a first annular groove 41,
   b. an "O" ring 42 dimensioned for receipt within said annular groove in said valve piston member; and
   c. a second annular groove 43 formed in said transverse passage for receiving a portion of said "O" ring to prevent accidental removal of said valve piston member from said transverse passage.

5. A locking drain valve assembly as described in claim 1 comprising:

a. said valve piston member is formed with a cylindrical portion 44 and a conical portion 45; and b. valve seat 13 is formed with a conical portion for registered receipt of said conical portion of said valve piston member.

6. A locking drain valve assembly as described in claim 1 comprising:

a. said connection means includes a threaded shank 34 connected to said upper wall of said valve housing and is formed with a passage 6 therethrough in communication with said inlet opening 7.

* * * * *